United States Patent [19]

Sigg et al.

[11] 4,351,114

[45] Sep. 28, 1982

[54] PROCESS FOR MEASURING USING STANDARD BLOCKS AND A STANDARD MEASURING BLOCK

[76] Inventors: Hans Sigg, Charmettes 15, CH-2006 Neuchâtel; Robert Viret, 111, Ave. de Morges, CH-1004 Lausanne; Heinz Wegmann, Chemin des Perreuses 6c, CH-2013 Colombier; Ernst Waser, Riedenstrasse 33, CH-6370 Stans, all of Switzerland

[21] Appl. No.: 130,166

[22] PCT Filed: Dec. 6, 1978

[86] PCT No.: PCT/CH78/00046

§ 371 Date: Aug. 6, 1979

§ 102(e) Date: Jul. 9, 1979

[87] PCT Pub. No.: WO79/00348

PCT Pub. Date: Jun. 28, 1979

[30] Foreign Application Priority Data

Dec. 6, 1977 [CH] Switzerland .................. 14883/77

[51] Int. Cl.³ ............................................. G01B 3/20
[52] U.S. Cl. ............................... 33/174 H; 33/168 R
[58] Field of Search .......... 33/174 R, 174 H, 174 L, 33/172 R, 172 E, 143 L, 147 N, 169 R, 169 C, 168 R, 168 A; 340/678, 686, 665, 690, 658, 691, 692; 324/80; 331/154, 156; 73/DIG. 1

[56] References Cited

U.S. PATENT DOCUMENTS

| | | | |
|---|---|---|---|
| 2,073,913 | 3/1937 | Wigam | 33/172 E |
| 2,217,509 | 10/1940 | Bryant | 340/678 X |
| 2,433,108 | 12/1947 | Foster | 33/169 X |
| 2,445,068 | 7/1948 | Jackson | 33/178 E |
| 2,554,271 | 5/1951 | Scepian et al. | 340/678 X |
| 2,831,256 | 4/1958 | Werle | 33/168 R |
| 3,242,738 | 3/1966 | Bellier | 73/DIG. 1 |
| 3,499,226 | 3/1970 | Hopkins | 33/169 |
| 3,541,849 | 11/1970 | Corbett | 310/338 X |
| 3,552,027 | 1/1971 | Jacobsen | 33/169 R X |
| 3,977,242 | 8/1976 | Brown | 73/DIG. 1 |
| 3,983,631 | 10/1976 | Dutzler | 33/143 L |

FOREIGN PATENT DOCUMENTS 191267 8/1937 Switzerland .
499367 1/1971 Switzerland .
1054748 11/1967 United Kingdom .

OTHER PUBLICATIONS

Werkstatt und Betrieb, vol. 109, No. 5, 5/78 (Munich), "Messen von der um Laufenden Spindel" p. 284.

*Primary Examiner*—Harry N. Haroian
*Attorney, Agent, or Firm*—Sherman & Shalloway

[57] ABSTRACT

Standard block comprising an element (L) kept in vibration by means of the motor (M). As soon as an object comes into mechanical contact with the measuring surface (C), the flexible-part (F) gives very slightly allowing the regulating screw (Vi) to disturb the free oscillations of the element (L). The detector (E) detects this disturbance and signals the moment of mechanical contact by means of the lamp (La) for example. The standard block allows precise measurements to be taken by announcing the moment of contact, without the measurement precision being influenced by the contact pressure.

16 Claims, 11 Drawing Figures

PROCESS FOR MEASURING USING STANDARD BLOCKS AND A STANDARD MEASURING BLOCK

The object of the present invention is a process for measuring using one or several standard blocks stacked so as to correspond to the desired reading, and also the standard block which allows the measurement according to the invention to be carried out.

At the present time, standard blocks are used for direct measurement and for the standardisation of measuring instruments. Thanks to the quality of their measuring surface they can be combined with one another by adhesion so as to obtain a standard of any length with a resolution of 1 micron (DIN 861 norm).

During direct measurement by means of a standard formed by one or several blocks joined together, the procedure is usually one of substitution by placing the piece to be measured on a carrier, in the field of measurement of a comparator and sensing the said piece at the chosen measurement point. Next one substitutes for the piece a set of blocks, the known dimension of which allows a reference measurement to be made. The measurement pressure is therefore known, it is the same in both cases and the comparator plays the role of a zero indicator.

However, there are cases where it is not possible or it is troublesome to resort to a comparator and to measure thus with a known pressure and where a simple indication of touch is desirable or sufficient.

This occurs particularly during regulating or setting to zero of a machine to be tooled or measured. Indeed, in this case the marking of the position of the tool or the vane or sensor with respect to a reference surface frequently takes place making it touch the surface of a block or of a stack of blocks placed between the reference surface and the tool or the sensor.

The precision of this marking depends to a large extent on the pressure exerted by the tool on the standard. It is therefore influenced by the sensitivity of the operator and the nature of the machine.

The present invention corrects this disadvantage and its aim is a process which allows the carrying-out of measurements using standard blocks without having to know the measurement pressure. It is characterised in that the last standard block of the stack announces the moment of contact with a probe.

The present invention also has as its object the standard block which allows the carrying-out of the measurement according to the invention, characterised in that it comprises an element maintained in vibration, a detector of the vibrations of the element and at least one signalling means announcing a change in the state of the vibrations.

The attached drawings show a possible embodiment of the standard block allowing the measuring process of the invention to be carried out.

Figure 1:
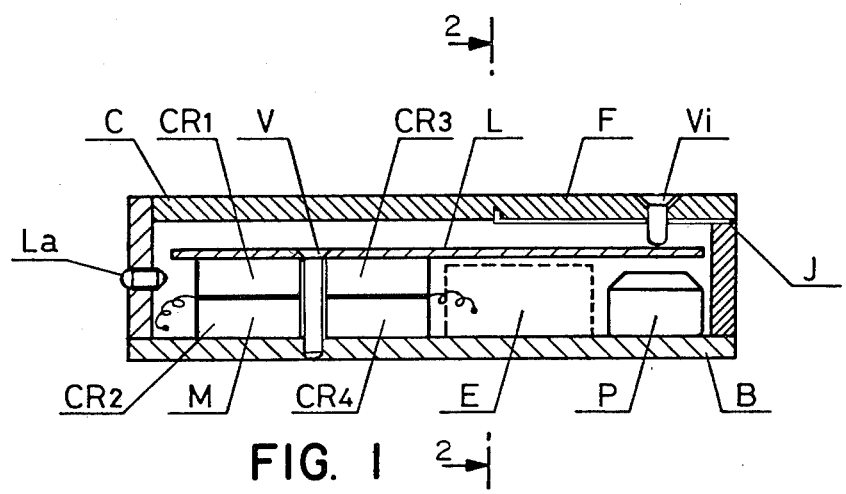
FIG. 1 is a longitudinal section view of the standard block according to the invention.

In FIG. 1 the standard block according to the invention is in the shape of a parallelapiped rectangle, the surfaces (B) and (C) of which are the standard distance surfaces. The interior comprises a plate (L), preferably a metal plate, set into vibration at its resonance frequency by a motor (M).

In this illustration the motor (M) is constituted by a sandwich of piezo-electric crystals (Cr 1) and (Cr 2). Another sandwich of piezo-electric crystals (Cr 3) and (Cr 4) acts as a transducer (T) so as to transform the mechanical oscillations of the vibrating plate (L) into an electric signal. The two piezo-electric crystal sandwiches are gripped between the plate (L) and the base (B) of the standard block by means of a screw (V) with a certain amount of prestress. The result is that the amplitude of the vibrations of the plate (L) is very small and it is in the order of some tenths of microns. In addition, inside the standard block a certain volume is reserved for the elements of the electronic control and detection circuit (E) and for the source of energy constituted by the battery (P). The method of signalling the mechanical contact with an external object (or probe) is indicated in the form of a lamp (La) fixed to the rear wall.

The reduced or flexible part (F) of the surface (C) is sensitive to the mechanical contact with any external object. This flexible part (F) of the standard block comprises a regulating screw (Vi) and the gap which separates it from the plate (L) can be precisely regulated.

Figure 2:
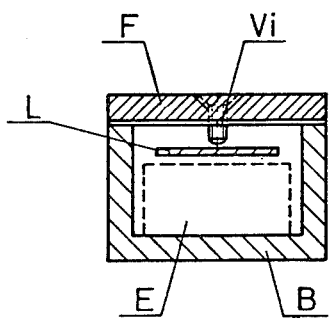
FIG. 2 is a horizontal section view along 2—2 of FIG. 1 of the standard block according to the invention.

In the section of FIG. 2 it can be seen that the base (B) and the lateral walls are preferably in a u-shapd piece so as to increase the rigidity of the whole.

To carry out the measuring in accordance with the invention, the base (B) is coupled with other blocks if this is necessary to achieve the desired reading. Next, when an object touches the surface (C) in its flexible part (F), the latter gives very slightly and allows the regulating screw (Vi) to touch the vibrating plate (L). The electronic system detector (E) detects any disturbance in the state of the vibrations and signals the moment of contact by lighting the lamp (La) for example.

Figure 3:
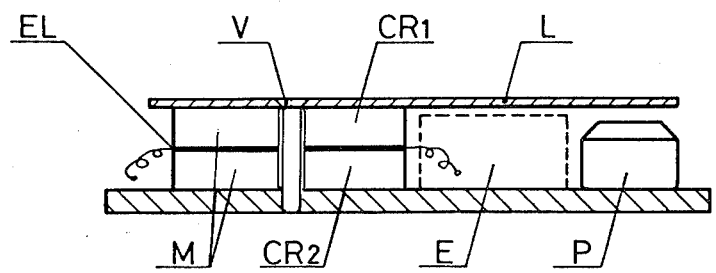
FIG. 3 is a partial longitudinal section of a variant of embodiment of the invention of FIG. 1.
Figure 4A:
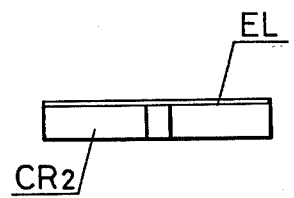
FIG. 4a is an elevation of FIG. 4.
Figure 4:
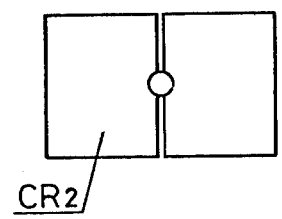
FIG. 4 shows in elevation and in plan an element of FIG. 3.

In a second form of construction, the interior of which is shown in FIG. 3, the motor and the transducer are constituted by a single sandwich, whose internal electrodes (El) of the piezo-electric crystals (Cr 1) and (Cr 2) are divided into 2 equal parts according to FIG. 4 which shows (Cr 2). These crystals are pierced in their centre and gripped with a certain amount of prestress by the screw (V). In this way, the motor is formed by the half sandwich on the left, for example, and the transducer by the one on the right. The action is like that of the system with two sandwiches.

Figure 5:
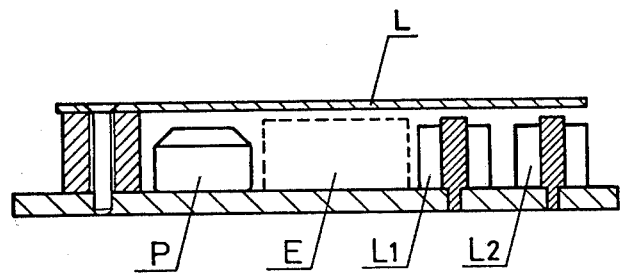
FIG. 5 shows in partial longitudinal section a further variant of embodiment of the invention.

In a third form of embodiment, according to FIG. 5, the motor and the transducer are of the electro-magnetic type, the core of the electro-magnet (Li) of transducer being constituted by a permanent magnet. They could also be of the electro-dynamic type, envisaging one or several permanent magnets integral with the vibrating plate (L) and moving inside coils.

Means other than the lamp (La) for signalling mechanical contact can be envisaged. One means consists in the use of short distance wireless transmission of the signal. This can be easily obtained by replacing the lamp (La) by a small antenna connected directly to the terminals of the motor circuit or of a circuit amplifying the voltage at the motor terminals. The vibration detector circuit must therefore be provided with an antenna and can be placed at a distance as well as the signalling means announcing the change in the state of the vibrations.

Still other possible signalling means would be acoustic means, ultra-sonic or infra-red means, which also allow the signalling of the contact to a remote receiver, a combination of these different means etc.

Figure 6:
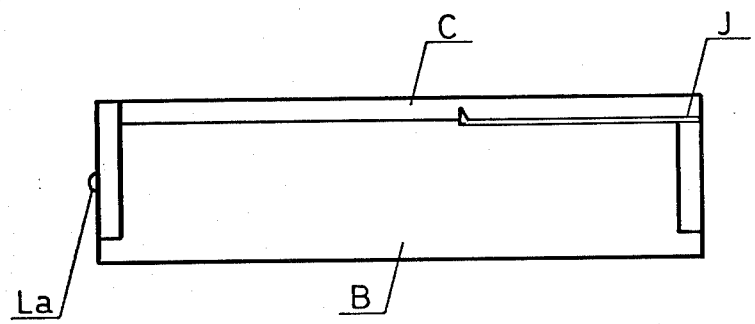
FIG. 6 is an external view in elevation of the standard block.

In FIG. 6 it can be seen that the flexible part (F) is linked to the lateral walls and the front wall by means of a sealing joint (j).

In the standard block according to the invention as shown in FIGS. 1 to 4 it is easy to change the battery (P) by unscrewing the front wall.

Figure 7:
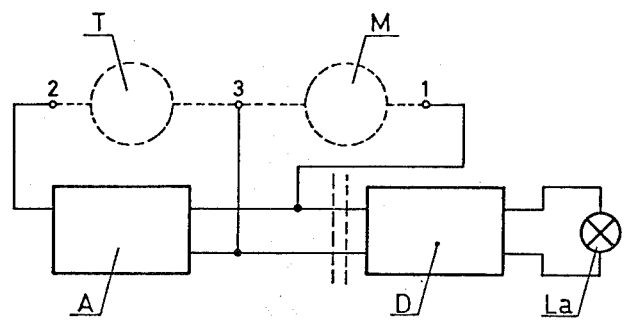
FIG. 7 is the block diagram of a variant of the electronic circuit of the standard block.

The block diagram of FIG. 7 shows a possible electric circuit of the standard block of the invention. (A) is an amplifier of a reaction circuit which amplifies the signal of the transducer (T) connected to the terminal (2) and sends it, with the adequate phase, to the motor (M) connected to the terminal (1). When the circuit is interlocked, a slight movement is sufficient to start the vibration of the plate (L) at its resonance frequency. The detector (D) is connected to the terminal (1) and to earth (3) and signals, by means of the lamp (La), any damping of the oscillations of the plate (L) and, if its circuit assembly allows it, any change in the frequency of the oscillations of the plate (L).

Figure 8:
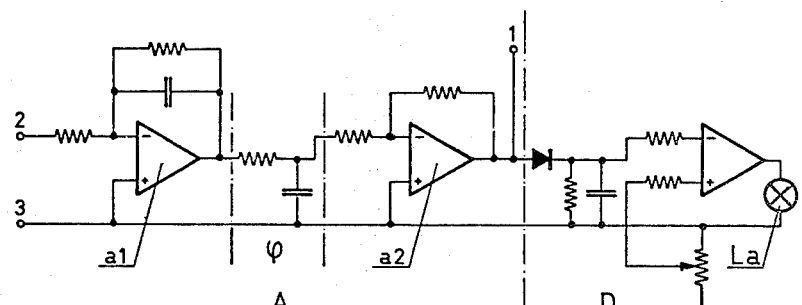
FIG. 8 shows in greater detail the elements of FIG. 7.

In FIG. 8 one finds, in greater detail, the amplifier parts (A) and detector parts (D) of the electronic circuit (E) of FIG. 7. The amplifier (A) comprises a first charge amplifier ($a_1$), a phase shifter ($\phi$) and an amplifier ($a_2$) adapted to the motor (M).

Figure 9:
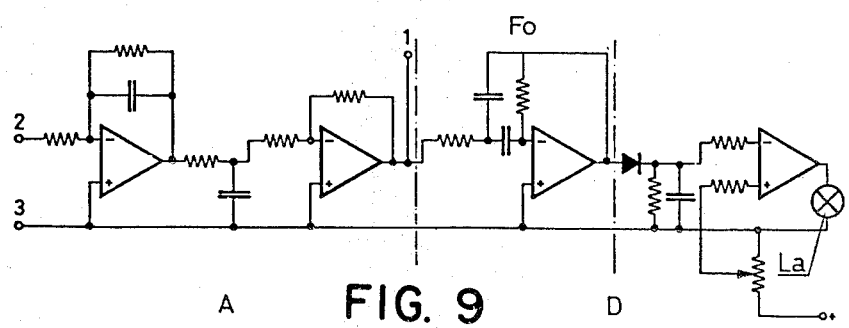
FIG. 9 is an improvement of the circuit of FIG. 8.

The detector (D) comprises a point rectifier followed by a level comparator. This detector of FIG. 8 is only sensitive to the amplitude of the mechanical oscillations. The lamp (La) lights as soon as the amplitude of the oscillations is below a level determined by the level comparator. In FIG. 9, the detector (D) comprises in addition a narrow-band filter ($F_o$) tuned into the resonance frequency of the plate (L) so as to increase the sensitivity of the detector (D) to any disturbance in the state of vibration.

Figure 10:
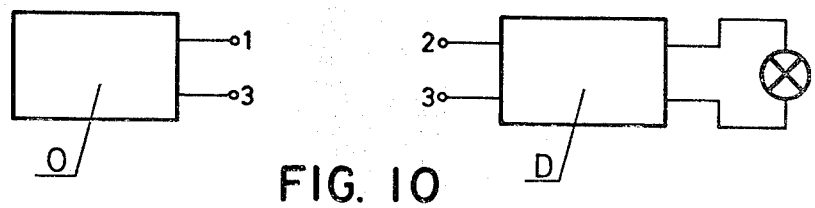
FIG. 10 is the block diagram of another electronic circuit of the standard block.

The electronic circuit (E) according to FIG. 10 illustrates a possible variant in which the oscillations of the plate (L) are no longer automatically maintained, but generated in a separate oscillator (O) which is branched to the terminals 1 and 3 of the motor. The detector (D) can be like one of the two variants mentioned previously, either with or without the filter $F_o$, or of any other type which allows the detection of a variation in the impedance of transfers (phase and amplitude).

Another variant of the systems described consists in using only one single oscillator element instead of two distinct elements; the motor and the transducer. The associated electronic circuit would then be called upon to detect any change in the state of the oscillator.

The scope of the invention is not limited to the embodiments described or illustrated. Instead one can envisage miniature standard blocks which can not comprise the electronic circuit (E) or the battery (P), or both at the same time. These elements could appear in a separate housing and the standard block would allow the measuring process to be carried out according to the invention. One could also envisage standard blocks not comprising a vibrating plate (L), but with an upper surface (C) which directly comprises a part vibrating at an amplitude in the order of 0.1 micron allowing precision in measurements of ±1 micron to be achieved.

We claim:

1. A standard measuring block comprising a parallelepiped, two parallel surfaces of which are set apart at a standard distance, having disposed therein an element maintained in vibration, a detector of the vibrations of the element and at least one signalling means announcing a change in the state of the vibrations caused by contact by an external object on one of said two parallel surfaces said vibrating element being constituted by a plate inside the standard block, said plate coming into contact with a flexible part of said surface contacted by said external object.

2. A standard measuring block according to claim 1 wherein the element maintained in vibration comprises a piezo-electric motor.

3. A standard measuring block according to claim 1 wherein the element maintained in vibration comprises an electro-magnetic motor.

4. A Standard measuring block according to claim 1 wherein a piezo-electric transducer is used to transform the mechanical vibrations into an electric signal.

5. A standard measuring block according to claim 1 wherein an electro-magnetic transducer is used to transform the mechanical vibrations into an electric signal.

6. A standard measuring block according to claim 1 wherein the element maintained in vibration and detector comprise two superposed piezo-electric elements, in which two distinct electrodes are divided right through the contact surface between the two piezo-electric elements, the first electrode being used for conveying the control current for maintaining the vibrations and the second for picking up an electrical signal due to the mechanical vibrations of the element.

7. A standard measuring block according to claim 1 wherein a single oscillator is used for maintaining the vibrations and for supplying an electrical signal revealing the state of the vibrations.

8. A standard measuring block according to claim 1 wherein the detector comprises a points rectifier and a level comparator.

9. A standard measuring block according to claim 1 wherein the detector comprises a narrow band filter tuned into the resonance frequency of the vibrating element, a points rectifier and a level comparator.

10. A standard measuring block according to claim 1 wherein the detector comprises a phase detector.

11. A standard measuring block according to claim 2 or 4 wherein the motor is controlled by the amplified electrical signal of a transducer.

12. A standard measuring block according to claim 2 or 4 wherein the motor is controlled by an electronic generator.

13. A standard measuring block according to claim 1 wherein the signalling means is an optical device.

14. A standard measuring block according to claim 1 wherein the signalling means is an acoustic device.

15. A standard measuring block according to claim 1 wherein the signalling means comprises a system of wireless transmission to a separate receiver.

16. A standard measuring block according to claim 15 wherein the wireless transmission system consists of an electro-magnetic transmitter-receiver element.

* * * * *